(12) United States Patent
Sundstrom

(10) Patent No.: US 9,686,367 B2
(45) Date of Patent: Jun. 20, 2017

(54) METHODS, SYSTEMS, AND COMPUTER PROGRAM PRODUCTS FOR PROVIDING PREDICTED LIKELIHOOD OF COMMUNICATION BETWEEN USERS

(75) Inventor: Robert J. Sundstrom, Cary, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 2313 days.

(21) Appl. No.: 11/724,646

(22) Filed: Mar. 15, 2007

(65) Prior Publication Data
US 2008/0225870 A1    Sep. 18, 2008

(51) Int. Cl.
| | | |
|---|---|---|
| H04L 12/54 | (2013.01) | |
| H04L 29/08 | (2006.01) | |
| G06Q 10/10 | (2012.01) | |

(52) U.S. Cl.
CPC ............ H04L 67/24 (2013.01); G06Q 10/10 (2013.01); H04L 67/306 (2013.01)

(58) Field of Classification Search
CPC ...................................................... H04L 67/24
USPC .................. 370/401, 465; 705/8, 9; 709/200
See application file for complete search history.

(56) References Cited

U.S. PATENT DOCUMENTS

| | | | |
|---|---|---|---|
| 6,618,716 B1 * | 9/2003 | Horvitz ............................ 706/55 |
| 6,832,245 B1 | 12/2004 | Isaacs et al. | |
| 6,917,829 B2 * | 7/2005 | Kwong .......................... 600/509 |
| 6,938,213 B2 | 8/2005 | Brown et al. | |
| 6,968,052 B2 | 11/2005 | Wullert, II | |
| 6,980,993 B2 | 12/2005 | Horvitz et al. | |
| 6,981,040 B1 * | 12/2005 | Konig et al. ................... 709/224 |
| 6,988,132 B2 * | 1/2006 | Horvitz .......................... 709/220 |
| 7,035,923 B1 | 4/2006 | Yoakum et al. | |
| 7,233,933 B2 * | 6/2007 | Horvitz et al. ................. 706/21 |
| 7,243,130 B2 * | 7/2007 | Horvitz et al. ............... 709/207 |
| 7,395,221 B2 * | 7/2008 | Doss et al. ......................... 705/9 |
| 7,457,879 B2 * | 11/2008 | Horvitz et al. ............... 709/227 |
| 7,490,122 B2 * | 2/2009 | Horvitz et al. ............... 709/200 |
| 7,493,369 B2 * | 2/2009 | Horvitz et al. ............... 709/207 |
| 7,519,676 B2 * | 4/2009 | Horvitz et al. ............... 709/207 |
| 7,571,108 B1 * | 8/2009 | Leban ............................... 705/8 |
| 7,577,246 B2 * | 8/2009 | Idan et al. ............... 379/265.01 |
| 7,584,114 B2 * | 9/2009 | Estrada et al. ..................... 705/9 |
| 7,613,670 B2 * | 11/2009 | Horvitz et al. ................. 706/46 |
| 7,634,528 B2 * | 12/2009 | Horvitz et al. ............... 709/200 |
| 7,739,210 B2 * | 6/2010 | Horvitz et al. ................. 706/21 |
| 2003/0041101 A1 | 2/2003 | Hansche | |

(Continued)

OTHER PUBLICATIONS

"Instant TeamMessenger™," Lincoln Burnett, www.lincolnburnett.com, p. 1 (Copyright 2006).

(Continued)

Primary Examiner — Brian O'Connor

(57) ABSTRACT

Methods, systems, and computer program products for providing predicted likelihood of communication between users are disclosed. According to one aspect, the subject matter described herein includes a method for providing predicted likelihood of communication between users. The method includes predicting a likelihood that a first user will initiate communication with a second user based on stored information for the first user that indicates the second user, associating the predicted likelihood with status information for the first user, and providing for indicating the status information with the predicted likelihood to the second user.

34 Claims, 7 Drawing Sheets

(56) References Cited

U.S. PATENT DOCUMENTS

| | | |
|---|---|---|
| 2003/0154293 A1 | 8/2003 | Zmolek |
| 2004/0111479 A1* | 6/2004 | Borden et al. ................ 709/206 |
| 2004/0153506 A1 | 8/2004 | Ito et al. |
| 2005/0021485 A1 | 1/2005 | Nodelman et al. |
| 2005/0038856 A1 | 2/2005 | Krishnasamy et al. |
| 2005/0227216 A1* | 10/2005 | Gupta ........................... 434/322 |
| 2006/0013140 A1* | 1/2006 | Pushparaj .................... 370/241 |
| 2006/0031366 A1 | 2/2006 | Dolph |
| 2007/0005754 A1* | 1/2007 | Horvitz et al. .............. 709/224 |

OTHER PUBLICATIONS

"Instant TeamMessenger 3.0 Combines Outlook and Sametime Dynamic Content Specific Buddylists Archive Chat in Outlook's Journal," www.instant-tech.com, pp. 1-2 (Sep. 9, 2004).

Horvitz et al., "Coordinate: Probabilistic Forecasting of Presence and Availability," Proceedings of the Eighteenth Conference on Uncertainty and Artificial Intelligence, pp. 1-10 (Jul. 2002).

Marti et al., "Active Messenger: Filtering and Delivery in a Heterogeneous Network," MIT Media Laboratory, pp. 1-19 (Feb. 17, 2002).

\* cited by examiner

METHODS, SYSTEMS, AND COMPUTER PROGRAM PRODUCTS FOR PROVIDING PREDICTED LIKELIHOOD OF COMMUNICATION BETWEEN USERS

TECHNICAL FIELD

The subject matter described herein relates to communication between parties. More particularly, the subject matter described herein relates to methods, systems, and computer program products for providing predicted likelihood of communication between users.

BACKGROUND

Presence systems are very popular and valuable. These systems provide a user with a dynamic indication of which of their contacts or friends are currently available. Generally, they indicate whether a friend is available for instant messaging, but they can also indicate other forms of presence, such as whether a person is available for a phone call or an in-person meeting.

Friends, however, are not static in their importance. At any particular time there are friends that a user is more likely to engage with, whether by initiating contact with that friend or by being more receptive to contact from that friend at a particular time. The likelihood of a user contacting a friend changes during the day as existing tasks are completed, new tasks are added, meetings approach and pass, and so forth. The likelihood of a user being receptive to contact from a friend also changes during the day, depending on whether the user is in a meeting or on the phone, for example, or depending on the number of tasks the user must accomplish, their deadlines, and their completion status. Some conventional systems, presence or otherwise, can determine how receptive or available a user is for contact from others. They do not, however, address this from the other direction, namely, whether another user is likely to contact them. Nor do they personalize availability status presented to other users. They may block the providing of status to some users, but the users that get the status all get the same status. They do not present an indication of how receptive a user is to contact initiated by another specific user.

There are advantages to knowing the likelihood that a first user may initiate communication with a second user. For example, if the second user knows that the first user is likely to initiate communication on a particular day or regarding a particular subject, the second user may take the opportunity to prepare in advance for the conversation. The second user may instead initiate the conversation first, rather than waiting for the first user to initiate the communication. If the second user knows, for example, that the first user is likely NOT to initiate communication during a certain time of day or day of the week (e.g., because the first user is in a scheduled meeting), the second user may choose a time during which it is more likely that the first user and second user will successfully communicate with each other. In other words, foreknowledge may increase the likelihood of successful, productive communication.

Accordingly, in light of the above described difficulties and needs, there exists a need for improved methods, systems, and computer program products for providing predicted likelihood of communication between users.

SUMMARY

The subject matter described herein includes methods, systems, and computer program products for providing predicted likelihood of communication between users. According to one aspect, the subject matter described herein includes a method for providing predicted likelihood of communication between users. The method includes predicting a likelihood that a first user will initiate communication with a second user based on stored information for the first user that indicates the second user, associating the predicted likelihood with status information for the first user, and providing for indicating the status information with the predicted likelihood to the second user.

According to another aspect, the subject matter described herein includes a system for providing predicted likelihood of communication between users. The system includes a communication initiation prediction subsystem for predicting a likelihood that a first user will initiate a communication with a second user based on stored information for the first user that indicates the second user. The system also includes a mapping entity for associating the predicted likelihood with status information for the first user. The system also includes a device for providing for indicating the status information with the predicted likelihood to the second user.

BRIEF DESCRIPTION OF THE DRAWINGS

Preferred embodiments of the subject matter described herein will now be explained with reference to the accompanying drawings of which.

DETAILED DESCRIPTION

Figure 1:
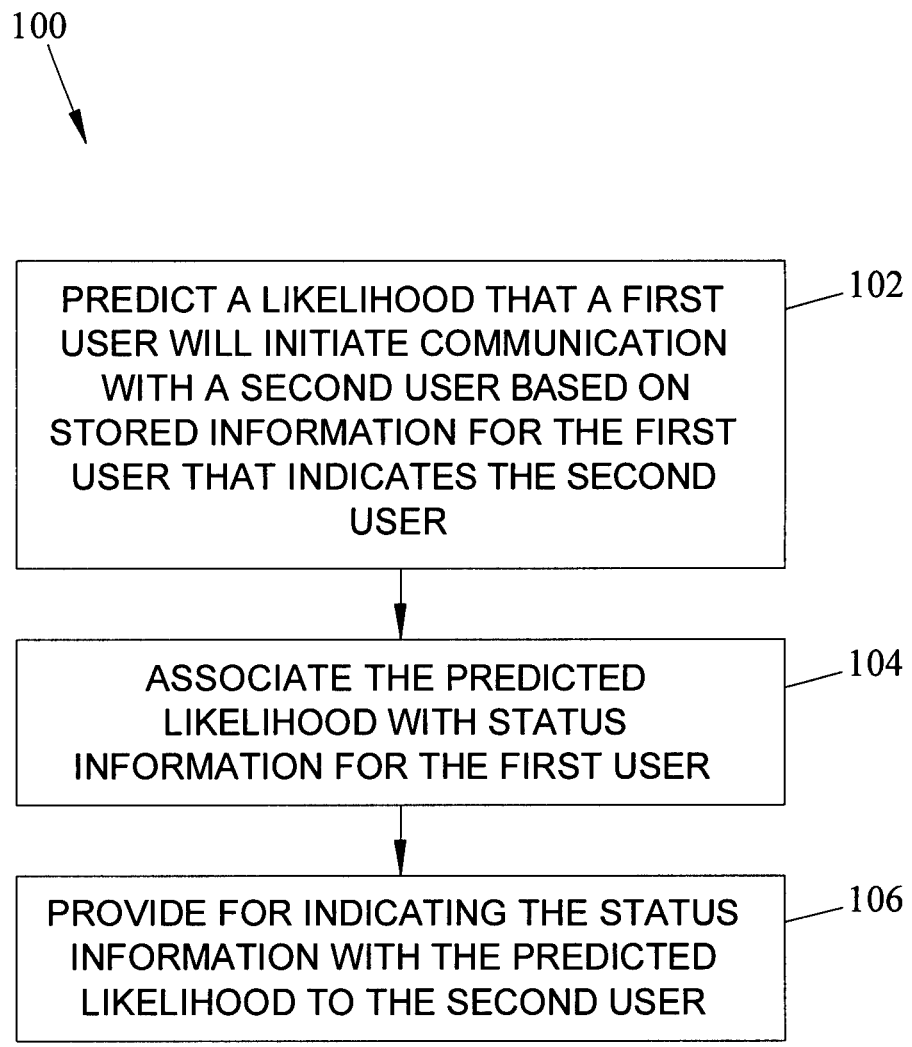
FIG. 1 is a flow chart illustrating an exemplary process for providing predicted likelihood of communication between users according to an embodiment of the subject matter described herein.

The subject matter described herein includes methods, systems, and computer program products for providing predicted likelihood of communication between users. According to one aspect, a system according to the subject matter described herein may be implemented as hardware, software, and/or firmware components executing on one or more components of a system configured to predict and communicate user contact needs.

As used herein, the term "presentation element" refers to any object supported by a user interface (UI) system. Although visual presentation elements are used in the examples described below, presentation elements are not limited to elements presented visually, but may also include elements that are presented via audible, tactile, and/or other such forms of presentation. The term "widget" or "user interface widget" is often used to refer to a presentation element by those skilled in the art. Examples of presentation elements include windows, panes, containers, and input controls. A subset of presentation elements is capable of displaying dynamic content, such as windows and panes of various types. In one example, a presentation element may be a window within a region of a display for presenting graphics and text. In another example, a presentation element may be an input control such as button for displaying text and/or graphics within a region of a display. Exemplary content within a presentation element includes video, images, text, and any other graphics suitable for display.

As used herein, the term "dynamic content" refers to presentable content that changes without requiring user intervention. Examples of dynamic content include video, a slide show, and animated displays. Other examples of dynamic content include active drawings (e.g., graphs of real-time performance statistics) and presentations including periodic or real-time updates of data (e.g., stock quotes, logs, and chat windows). Dynamic content may be broadcast content, such as a television video broadcast.

As used herein, the term "application" refers to an executable associated with a presentation element. For the purposes of this description, a single application with two or more separate presentation elements is considered to be two or more applications each with an associated presentation element.

As used herein, the terms "friend", "target contact", and "contact" refer to a person or entity with whom a user may communicate. The term "friend" may be used to refer to a business contact, a family member, a personal friend, and/or a person or entity that is not a friend in the social sense. A friend is not necessarily another user of a particular application or service. For example, a friend may be a person to whom a first user may send a package or letter but who is not a user of a computer system, and/or messaging or presence application used by the first user. Thus, the terms "friends list" or "contact list" refer to a list of persons and/or entities with whom a user may communicate. A friends list may be distinct from a user's address book, telephone list, buddy list, or other list of people with whom a user communicates via email, telephone, messaging application and/or other application. However, the friends list may contain names or other contact information culled from some or all of these and other sources.

As used herein, a "computer readable medium" can include one or more of any suitable media for storing the executable instructions of a computer program in one or more of an electronic, magnetic, optical, and electromagnetic form, such that the instruction execution machine, system, apparatus, or device can read (or fetch) the instructions from the computer readable medium and execute the instructions for carrying out the described methods.

A non-exhaustive list of conventionally exemplary computer readable medium includes: a portable computer diskette; a random access memory (RAM); a read only memory (ROM); an erasable programmable read only memory (EPROM or Flash memory); optical storage devices, including a portable compact disc (CD), a portable digital video disc (DVD), and the like.

According to an exemplary embodiment, the likelihood that a first user will initiate contact with a second user is predicted and made available to the second user. This may be accomplished by creating a list of friends that the first user might wish to contact, and for each friend on that list, calculating a prediction of the likelihood that the first user will initiate contact with that friend. These likelihoods may be included in the first user's presence information that is sent to a presence server. The presence server, in turn, may include the appropriate indicator when sending the first user's presence to a subscriber. The friends list can be generated by combing through tasks, calendar entries, and project plans for names of contacts.

The presence client for subscribers to the first user's presence may receive the likelihood indicator as part of the presence information and may use it to modify a characteristic of a presentation element of a device of the second user. For example, the first user's name may be shown using a bold font on the second user's display; the text associated with the first user (e.g., the first user's name or identity) may be modified, or additional text may be added. Similarly, an image or icon associated with the first user may be modified or added. The presence client may re-order the second user's contact list based on status and predicted likelihood of each of the second user's contacts. Thus, the second user may be informed that the first user is likely to contact them or that the first user may be more receptive to contact from the second user at this time. The second user may wish to preemptively initiate contact with the first user, prepare materials in advance of contact from the first user, or simply avoid surprise. The second user's presence client may, for example, hide or otherwise remove from the second user's list all contacts who are unlikely to contact the second user. Similarly, predicted likelihoods can be computed for each of the friends in the first user's friends list. These likelihoods can then be used to reorder the first user's friends list, such as moving the friends that are more likely to be contacted to the top of the first user's list, thus making the first user's contact list more usable and responsive to the first user's immediate needs. The friends that the first user is more likely to contact could also be highlighted in other ways such as by bolding, color or other UI techniques. One or more of the above information can be presented via audible, tactile, and/or other such means.

Figure 3:
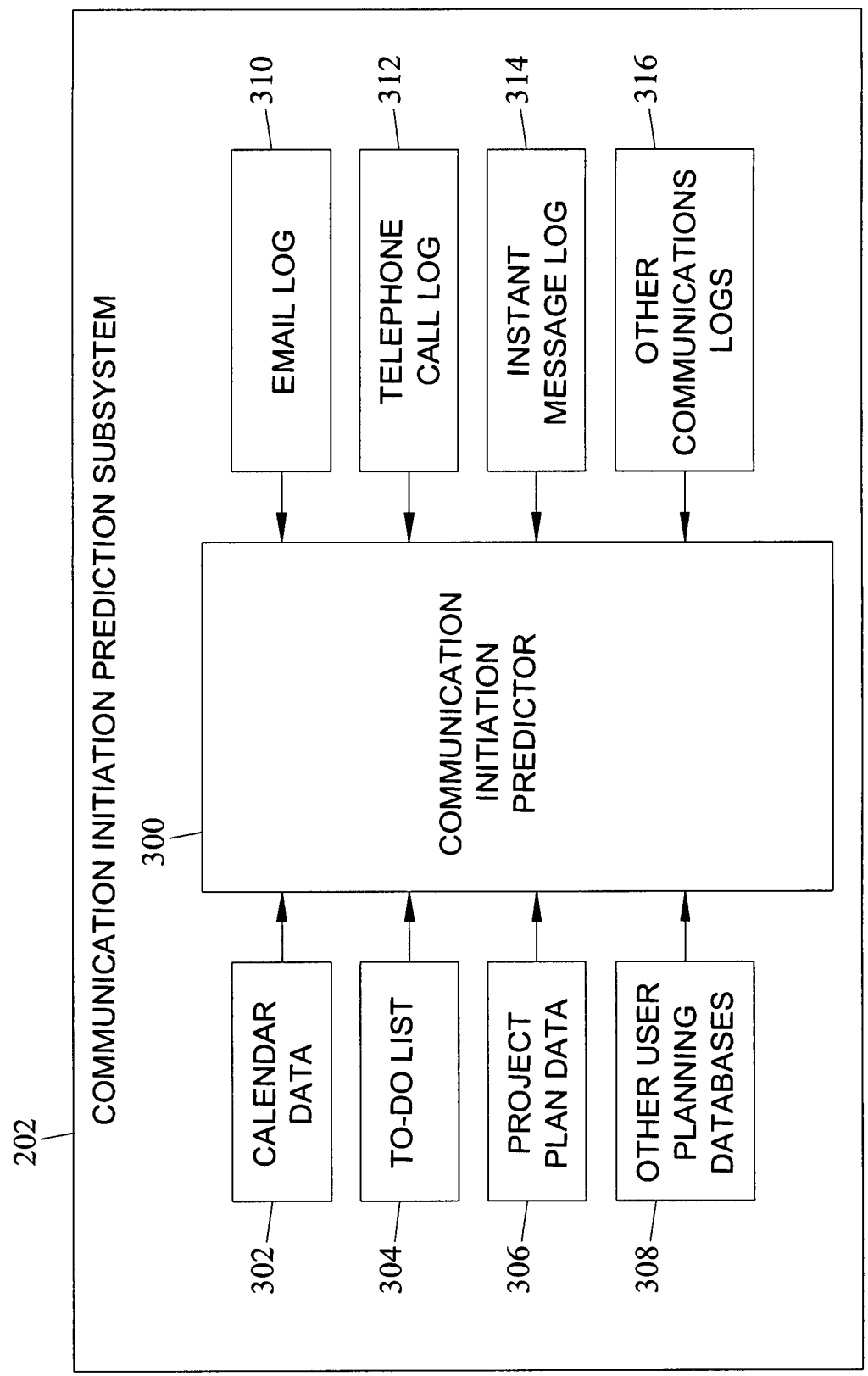
FIG. 3 is a block diagram illustrating an exemplary communication initiation prediction subsystem of a system for predicting a likelihood that a first user will initiate a communication with a second user based on stored information for the first user that indicates the second user according to an embodiment of the subject matter described herein.
Figure 4:
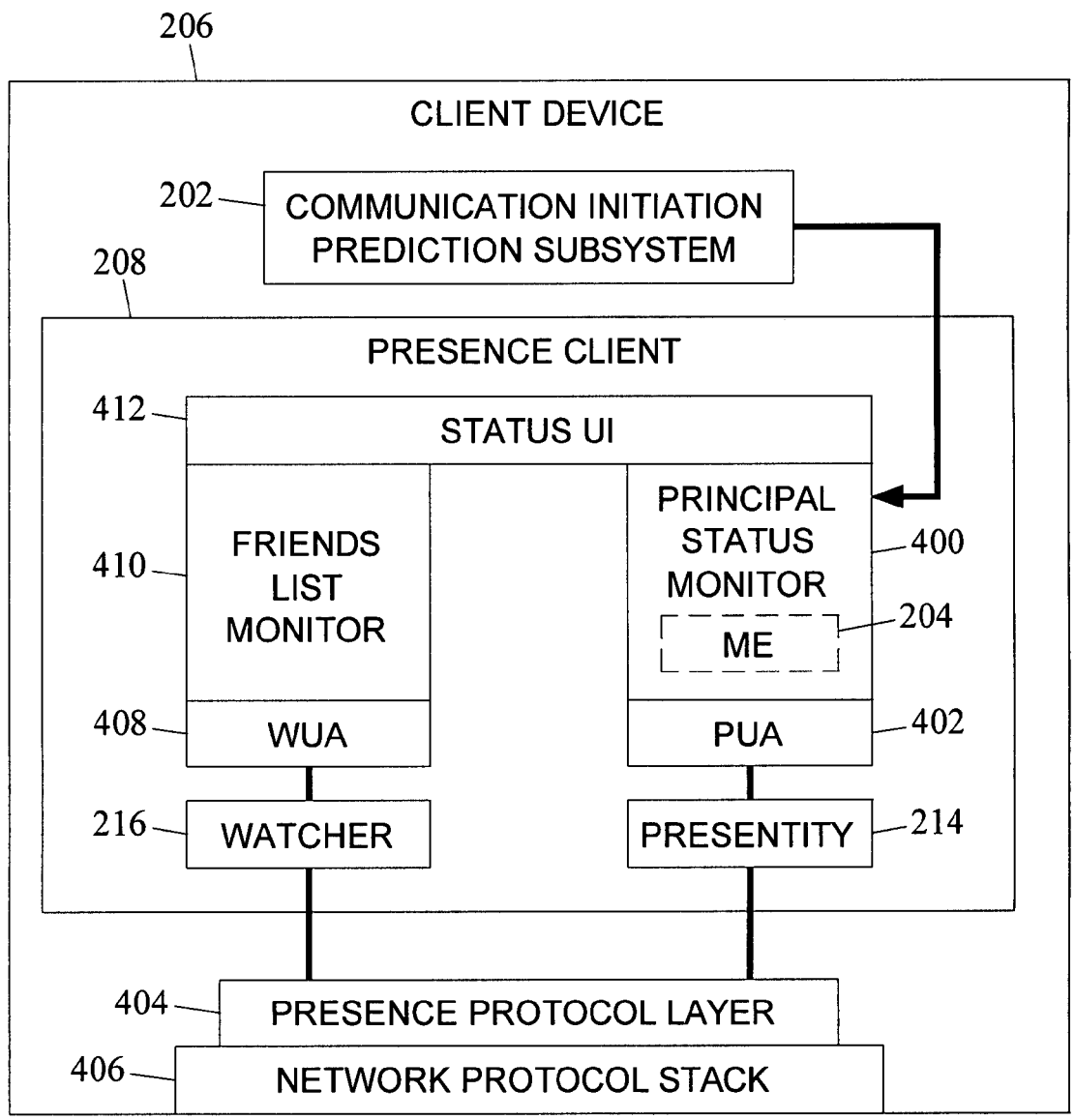
FIG. 4 is a block diagram illustrating an exemplary device subsystem of a system for providing for indicating the status information with the predicted likelihood to the second user according to an embodiment of the subject matter described herein.

FIG. 1 is a flow chart illustrating an exemplary process for providing predicted likelihood of communication between users according to an embodiment of the subject matter described herein. An embodiment of method 100 in FIG. 1 is described below, in terms of an embodiment of system 200 as illustrated in FIGS. 2, 3, and 4.

At block 102 of method 100 a likelihood that a first user will initiate communication with a second user is predicted. The prediction is based on stored information for the first user that includes indications regarding the second user. System 200 in FIG. 2 includes means for predicting a likelihood that a first user will initiate communication with a second user based on stored information for the first user that indicates the second user.

Figure 2:
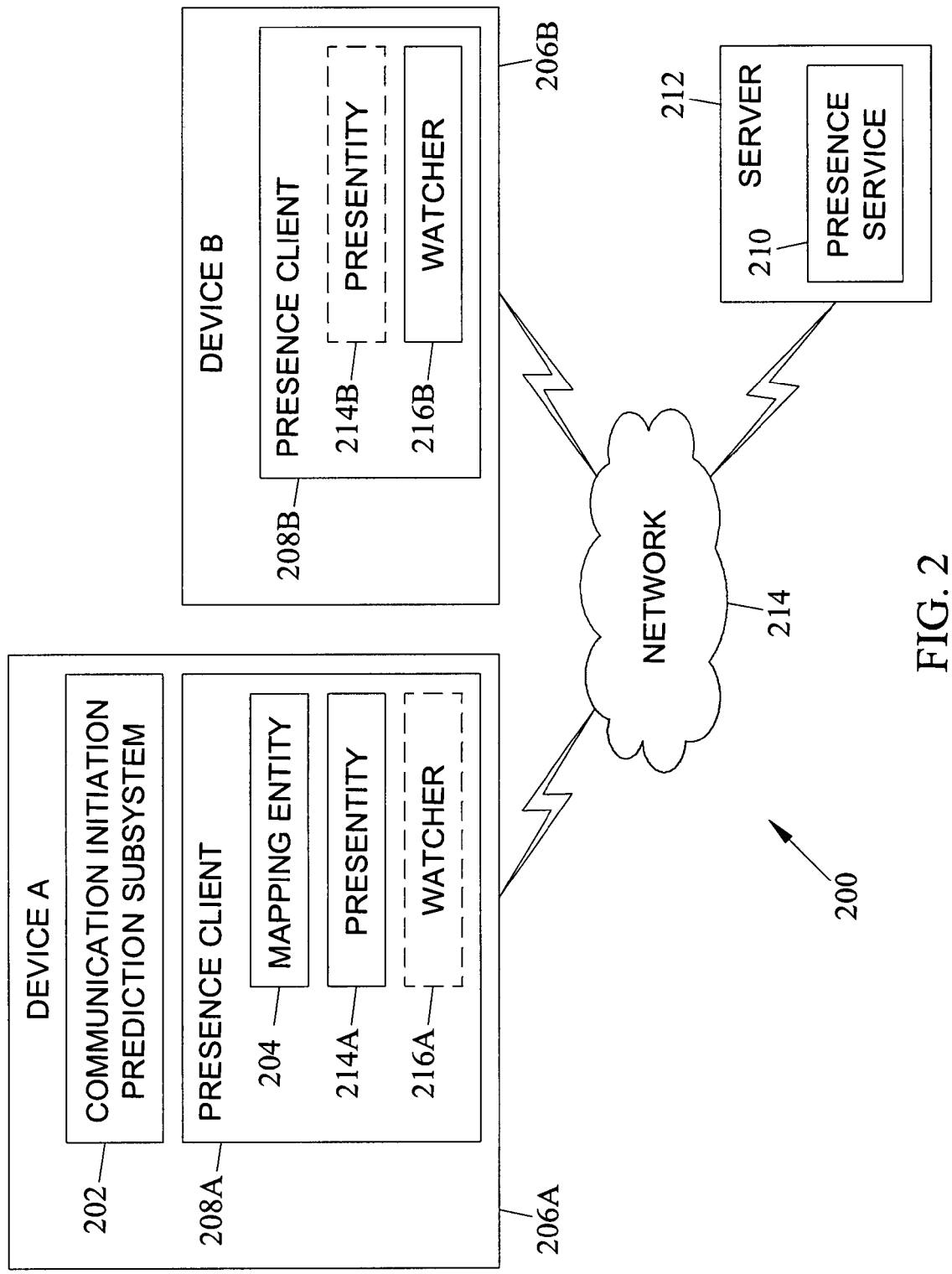
FIG. 2 is a block diagram illustrating an exemplary system for providing predicted likelihood of communication between users according to an embodiment of the subject matter described herein.

FIG. 2 is a block diagram illustrating an exemplary system for providing predicted likelihood of communication between users according to an embodiment of the subject matter described herein. Referring to FIG. 2, system 200 includes a communication initiation prediction subsystem 202 for predicting a likelihood that a first user will initiate communication with a second user based on stored information for the first user that indicates the second user. Communication initiation prediction subsystem 202 may predict the likelihood that the first user will accept an attempted contact from the second user. System 200 also includes a mapping entity 204 for associating the predicted likelihood with status information for the first user. System 200 also includes a first device A 206A for providing for indicating the status information with the predicted likelihood to the second user, and a second device B 206B for receiving the status information with the predicted likelihood and for indicating to the second user the status information, the predicted likelihood, or both. First device A 206A and second device B 206B are collectively and generically referred to as devices or device 206.

In the embodiment illustrated in FIG. 2, device A 206A and device B 206B each provide an operating system environment for a presence client A 208A and a presence client B 208B, respectively. Presence client A 208A and presence client B 208B, which in this embodiment are collectively and generically referred to as presence clients or client 208, are capable of communicating with a presence service 210 running in an operating system environment provided by a server 212 using a presence protocol transmitted via a network 214. Mapping entity 204 receives the predicted likelihood created by communication initiation prediction subsystem 202 and associates it with the first user's status. Device 206 provides for indicating the status with the associated predicted likelihood to the second user, via client 208 for example. Presence client A 208A contains presentity A 214A and watcher A 216A, and presence client B 208B contains presentity B 214B and watcher B 216B. In an alternative embodiment, first device A 206A may provide for indicating the status information with the predicted likelihood to the second device B 206B by using another protocol, such as a publish/subscribe protocol other than a presence protocol; an email protocol; and/or a messaging protocol, such as an instant messaging (IM), short message service (SMS), and/or multimedia messaging service (MMS). In such alternative embodiments, device 206 may not include a presence client 208.

Predicting the likelihood may be performed by a device of the first user. For example, in the embodiment illustrated in FIG. 2, communication initiation prediction subsystem 202 and the stored information for the first user are located on a device of the first user, such as first device A 206A. In alternative embodiments, communication initiation prediction subsystem 202 and/or the stored information for the first user may be located somewhere other than within first device A 206A. For example, if the stored information for the first user is not local to the first user, but is instead located on server 212, communication initiation prediction subsystem 202 may be located on server 212. Alternatively, communication initiation prediction subsystem 202 may exist on another server or another device used by the first user and the likelihood predictions would be sent to either first device A 206A or server 212.

FIG. 3 is a block diagram illustrating an exemplary subsystem, communication initiation prediction subsystem 202, for predicting a likelihood according to an embodiment the subject matter described herein. Communication initiation prediction subsystem 202 was introduced in FIG. 2 and depicted as a subsystem operating within the operating environment of device A 206A. Communication initiation prediction subsystem 202 as shown in FIG. 3 illustrates exemplary components for providing the predicted likelihood.

Referring to FIG. 3, communication initiation prediction subsystem 202 may include a communication initiation predictor component 300 and a number of data sources containing stored information for the first user that indicates the second user. The stored information for the first user may include, but is not limited to, information from planning data sources, such as calendar data 302, to-do lists 304, project plan data 306, and other user planning databases 308. The stored information for the first user may include, but is not limited to, information from communication history data sources, such as email logs 310, telephone call logs 312, instant messaging logs 314, and other communication logs 316. These data sources may contain information indicating current and future activity of the first user, and/or indicating past activity of the first user. This data may be analyzed by communication initiation predictor component 300 to produce the predicted likelihood.

In one embodiment, parameters used to predict the likelihood are customizable by the first user, based on the source of the stored information for the first user, the type of the stored information for the first user, and the identity of the second user. For example, a to-do list entry that says "Call User B" could be given more weight in determining the likelihood that User A will contact User B than would be given to an appointment for a meeting of which User B is an attendee. In another example, contacts that are identified to be family members of the first user may be assigned a higher probability of contact by the first user than would be assigned to non-family members.

The predicted likelihood may be a predicted probability and may be represented by a number between 0 and 1. This number can be determined in various ways, as will be described below. In one embodiment, the predicted likelihood may be assigned fixed probabilities. In an alternative embodiment, the predicted likelihood may be assigned calculated probabilities. For example, some embodiments may analyze context information detected in association with each occurrence of a to-do type, and/or the priority label of each to-do, and so on, and adjust the assigned probabilities accordingly. To-do items, calendar entries, etc., may be detected occurring in sequence, together within a specified time period, or in a pattern. For example, conditional probabilities may be determined based on past occurrence and Bayesian statistics may be used to calculate predicted probabilities of items that are scheduled or listed for future action.

Once the number representing the predicted likelihood is determined, it may be conveyed to the second user as a numeric probability, or it may be translated first. For example, it could be multiplied by 100 to convert it to a percentage, it could be translated to a label according to a policy, or it could be translated to a label according to a range of values. For example, the label-probability associations can be configured as:

If greater than or equal to 0.8 the number is translated to 'highly likely'
If greater than or equal to 0.5 and less than 0.8, it is translated to 'likely'
If greater than or equal to 0.2 and less than 0.5, it is translated to 'somewhat likely'
If less than 0.2, it is translated to 'unlikely.'
A predicted likelihood would not exceed 1.0.

In one embodiment, an individual user may also be able to customize the translation of the predicted likelihood values to labels, which can include phrases. For example, a user may wish to customize the translation so that any predicted likelihood greater than or equal to 0.5 that was derived using planning data sources would translate to the phrase: "Planning to contact you today."

In one embodiment, the predicted likelihood may be based on planning data, i.e., information indicating current and future activity of the first user. For example, communication initiation predictor component 300 may analyze the information from planning data sources, such as calendar data 302, to-do lists 304, project plan data 306, and other user planning databases 308. Communication initiation predictor component 300 may analyze these data sources and look for the names and/or the contact addresses of other users in entries within a time frame such as the current day. If a contact address is found, then an address book or other directory database may be used to determine the associated name. Each time an entry is found, the contact name and the name of the data source may be recorded. Other information such as the topic, the priority of the entry, and any time information from the entry may be recorded. After all the planning data sources have been scanned for names and/or contact addresses, the results may be combined and analyzed to generate the predicted likelihood as will be described.

As an example of using to-do lists 304 to derive the predicted likelihood, if User A puts a high-priority entry on his to-do lists 304 to call User B today regarding a work-related issue, User A's communication initiation predictor component 300 would read this entry, identify the action as a 'call' action, identify User B as the target of the action, and note the high-priority. From this information User A's communication initiation predictor component 300 could assign a predicted likelihood that he will contact User B. The assigned value could be provided by the vendor or service provider that is providing the contact prediction function. An individual user may be able to customize the assigned value. For example, the first user may know that, on average, they get to only half of the high priority items on their to-do lists 304 in any given day. Thus, they may wish to customize their predicted likelihood values and assign a 0.5 predicted likelihood for this case. Alternatively, an individual user may be able to customize the assigned value based on the second user toward whom the predicted likelihood is directed.

In another embodiment, the predicted likelihood may be based on historical data, i.e., information indicating past activity of the first user, such as prior communications between the first and second users. For example, the information from historical data, such as email logs 310, telephone call logs 312, instant messaging logs 314, and other communication logs 316, may be analyzed by themselves for patterns, without consideration of entries in planning data sources, by communication initiation predictor component 300. These patterns may then be used to generate the predicted likelihood.

In one embodiment communications log entries are analyzed for a period of time. For example, if it is determined that User B called her sister every Friday for the past 6 months and it is Friday today, then the predictor may deduce that it is highly likely that User B will call her sister today. As with the planning sources, the results of analyzing historical data, such as the logs for each type of communication, can be combined to improve the predicted likelihood that communication will be initiated using one of the means of communication. For example, if User B did not call her sister every Friday, but did initiate contact by some means whether it was a call, an email, an instant message or other form of communication for which a log as available, then the predictor may predict with equal confidence, that User B is highly likely to initiate contact with her sister.

In one embodiment, the results of analysis of both the planning data and the historical data may be combined to yield a predicted likelihood based on both sets of data. For example, the likelihood may be predicted based on indications of prior communications by the first user and indications of intent to initiate subsequent communications by the first user. In an example scenario, User A's calendar data 302 includes an entry for a group meeting for today and this meeting is a recurring, weekly meeting. The regular invitees are User A, User B, and others. Communication initiation predictor component 300 finds the meeting on the calendar and determines who is invited. It can then look at User A's communications logs for days in the past when this meeting was scheduled and determine if User A contacted User B on those days. If, for example, communication initiation predictor component 300 finds 16 occurrences of this meeting and finds that User A called User B on 12 of those days, it can predict that User A is likely (e.g., predicted likelihood=0.75) to contact User B today. Communication initiation predictor component 300 can be further configured to note days of the week on which contacts did and didn't occur. In the current example, of the 16 occurrences of the meeting, 10 occurred on a Saturday, and User A called User B on 9 of those days. Thus, if a scheduled meeting is on a Saturday a probability of 0.9 is assigned. Probabilities associated with other days of the week can be derived analogously.

In one embodiment, communication initiation predictor component 300 will find an entry in a planning data source with an associated name, search the planning data sources for related entries, and then search the communications logs for the days with the related entries and count the number of times communications was initiated on those days versus the total number of days that contained related entries. In the example of User A and the meeting, it found 16 days with related entries and it found that communications to User B was initiated by User A on 12 of those days. If the sample size is adequate (discussed below) then a likelihood of $12/16=0.75$ is determined.

If the sample size is not adequate, then a broader search can be performed to determine the likelihood of User A contacting someone (not just User B) when that person was scheduled to be in a meeting with User A that day. The result of this analysis will be more generic since it will pertain to everyone User A meets with, but is still superior to simply using an a priori likelihood. If there is not sufficient data to accurately predict the likelihood indicator based on the broader search, then communication initiation predictor component 300 falls back on using the a priori likelihood. So, if User A has no other entries on his calendar, there will not be enough historical communications data to make a prediction based on the communications logs, but an a priori likelihood can still be assigned.

Determining whether there is enough data to make an accurate prediction is similar to selecting a minimum sample size. The minimum sample size depends on a number of factors. These include the error of estimation and the associated probability that the prediction will be correct with a margin of error specified by the error of estimation. Determining the minimum sample size is taught in standard statistics textbooks. Using these methods an approximation of the minimum sample size may be calculated. For example, assuming an error of estimation of 0.2 with a probability equal to 0.90, the sample size n can be estimated from the following equation, where p is the probability that a person will initiation communication:

$$n=1.645*1.645*p*(1-p)/0.04$$

Since the value of p is unknown, p may be assigned the value of 0.5 in order to give the maximum n.

$$n=1.645*1.645*0.5*(1-0.5)/0.04=16.9$$

Thus, at least 17 samples are required to make a prediction within the specified accuracy. Other errors of estimation and associated probabilities can be chosen.

Alternatively, the likelihood may be predicted based on an analysis of the correlation between the first user's demonstrated intent to communicate with the second user and the first user's actual communication with the second user at the intended times. For example, if User A's calendar contained "Call User B" entries on 10 of the last 60 days but User A's telephone logs show that User A called User B on only one of those 10 days, the calculated probability of communication could be lowered based on the determination that there is a very low correlation between the first user's demonstrated intent to call User B and UserA's actual communication with User B. The communication logs may be used as historical communication data to generate both isolated and conditional probabilities associated with the planning data sources.

In one embodiment, recent user actions may be included in the analysis when predicting the likelihood of initiating communication. For example, the first user may have just read an email sent by a second user (which may or may not be a recent email) or have opened a document authored by a second user. Predictive analysis of the first user's historical communication logs can be used to determine if this increases the likelihood of the first user initiating contact with the second user in the near future. Factors that best contribute to these predictions may be learned by tracking actual contacts made, and also taking into consideration contacts received, since if the second user contacts the first user first, contact was made and perhaps even was instigated by the use of this system.

In general, multiple dimensions of the first user's activity across multiple communications means, appointments status and status from other planning data sources may be stored so that the information may be retrieved for analysis, such as in a relational database, for example. Predictive models may be gleaned by making queries for information across these multiple dimensions of the database. Several methods may be employed to build predictive models, including regression analysis and time series analysis, which may be used to predict the likelihood of the first user initiating communication with another user.

In one embodiment, the stored information for the first user that indicates the second user is located on or within the first user's client device 206 and the analysis of this information is also performed on the first user's client device 206. The first user's device, including a mobile device, is one place to create and maintain the list of friends that the first user may wish to contact and the associated likelihoods that they will initiate contact. It has ready access to key sources of predictive information:

The first user's tasks or to-do list, upon which the first user has explicitly set out their current priorities. This list can be mined for people to contact and priorities and schedules associated with these activities.

The first user's database or other record of current or ongoing projects, along with contacts, schedules, and priorities.

The first user's calendar. Contacts from calendar entries, particularly for the current and the next day, are particularly important for the first user because, like the tasks list, they are a direct representation of what the first user has planned to work on, participate in, or accomplish.

While the predicting and learning can be performed on a mobile device, it also could be performed on a desktop client or be provided by a service in the network.

In an alternative embodiment, the location of the stored information may be distributed. For example, the first user's calendar data 302 may be maintained on server 212. In this case, communication initiation predictor component 300 would request calendar data 302 from server 212 rather than accessing it locally.

Similarly, the analysis of the stored information may be distributed. For example, it is also possible for the likelihood indicator itself to be determined on server 212 or on another device 206. Distributed prediction of likelihood makes the most sense when the data sources used to determine the likelihood indicator are available on that server or device. In this case, communication initiation prediction subsystem 202 may reside remotely from the first user's client device 206 and its output is then passed to device 206 or server 212 for association with the first user's status.

At block 104 of method 100 the predicted likelihood is associated with status information for the first user. System 200 includes means for associating the predicted likelihood with status information for the first user.

In a presence system, this act of associating can be performed by either the sending presence client or the presence server. For example, mapping entity 204 may exist within a user's client or device and/or within a server. Embodiments for both of these alternatives are described below.

In an example scenario, referring to FIG. 2, User A is a principal associated with presence client A 208A representing User A to presence service 210 by presentity A 214A and a watcher A 216A included in presence client A 208A. User B is a principal associated with presence client B 208B representing User B to presence service 210 by presentity B 214B and watcher B 216B included in presence client B 208B. Presentity A 214A and presentity B 214B are collectively and generically referred to as presentities or presentity 214. Similarly, watcher A 216A and watcher B 216B are collectively and generically referred to as watchers or watcher 216. For the example scenario, watcher A 216A and presentity B 214B are not required for performing method 100.

In this scenario, presence client A 208A receives predicted likelihood information from communication initiation prediction subsystem 202. The predicted likelihood information includes information regarding the predicted likelihood that User A will initiate communication with User B. The predicted likelihood is represented by the text string: "Very likely to contact you." The text string is a message representing the prediction that User A is very likely to contact User B in the near future. When an indication to associate the predicted likelihood is received by presence client A 208A, a presence tuple including the predicted likelihood is generated. This is performed by mapping entity 204 within presence client 208 when it receives the predicted likelihood information from communication initiation prediction subsystem 202.

Figure 5:
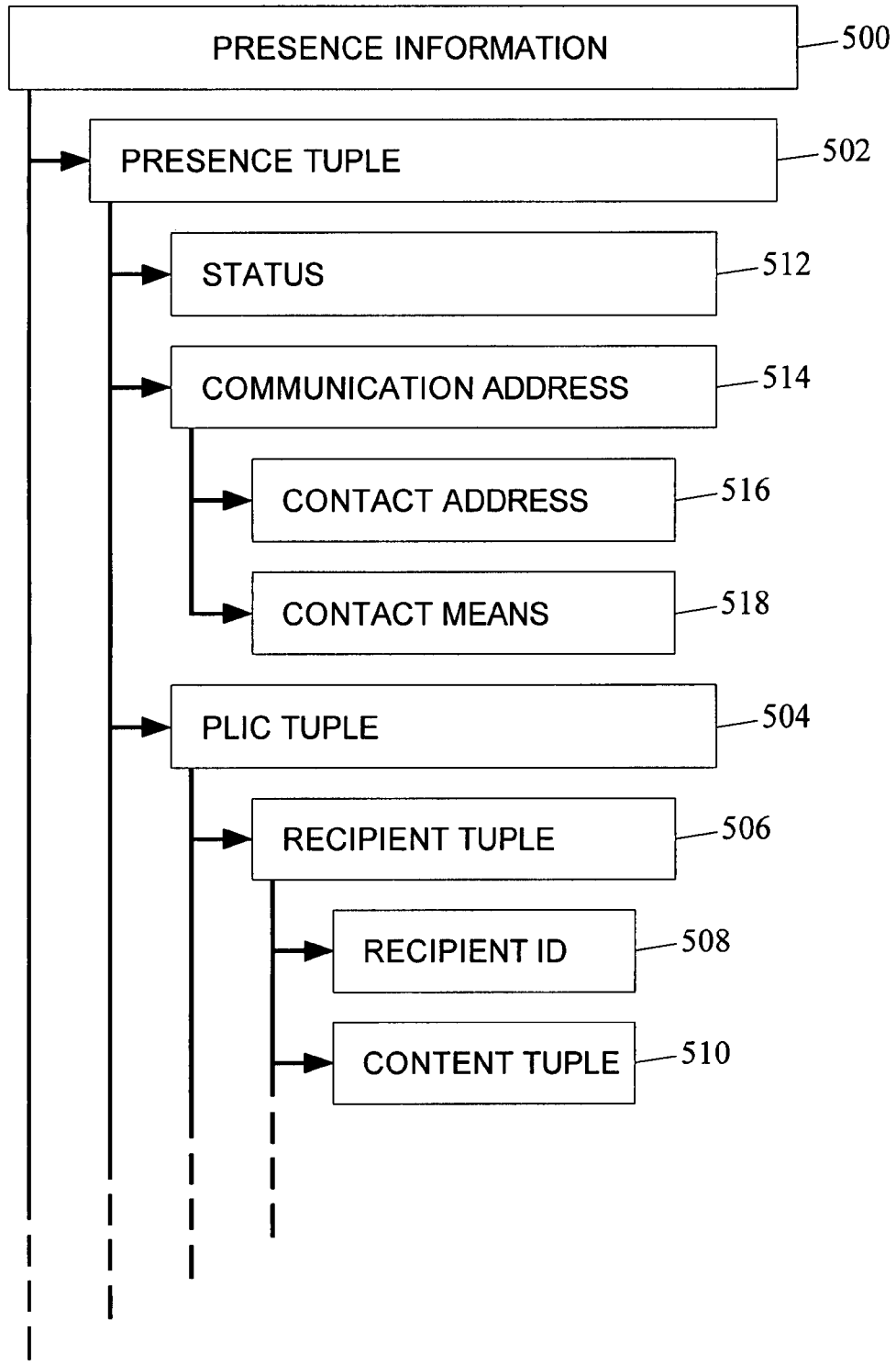
FIG. 5 is an exemplary data/message structure used for associating the predicted likelihood with status information for the first user according to an embodiment of the subject matter described herein.
Figure 6:
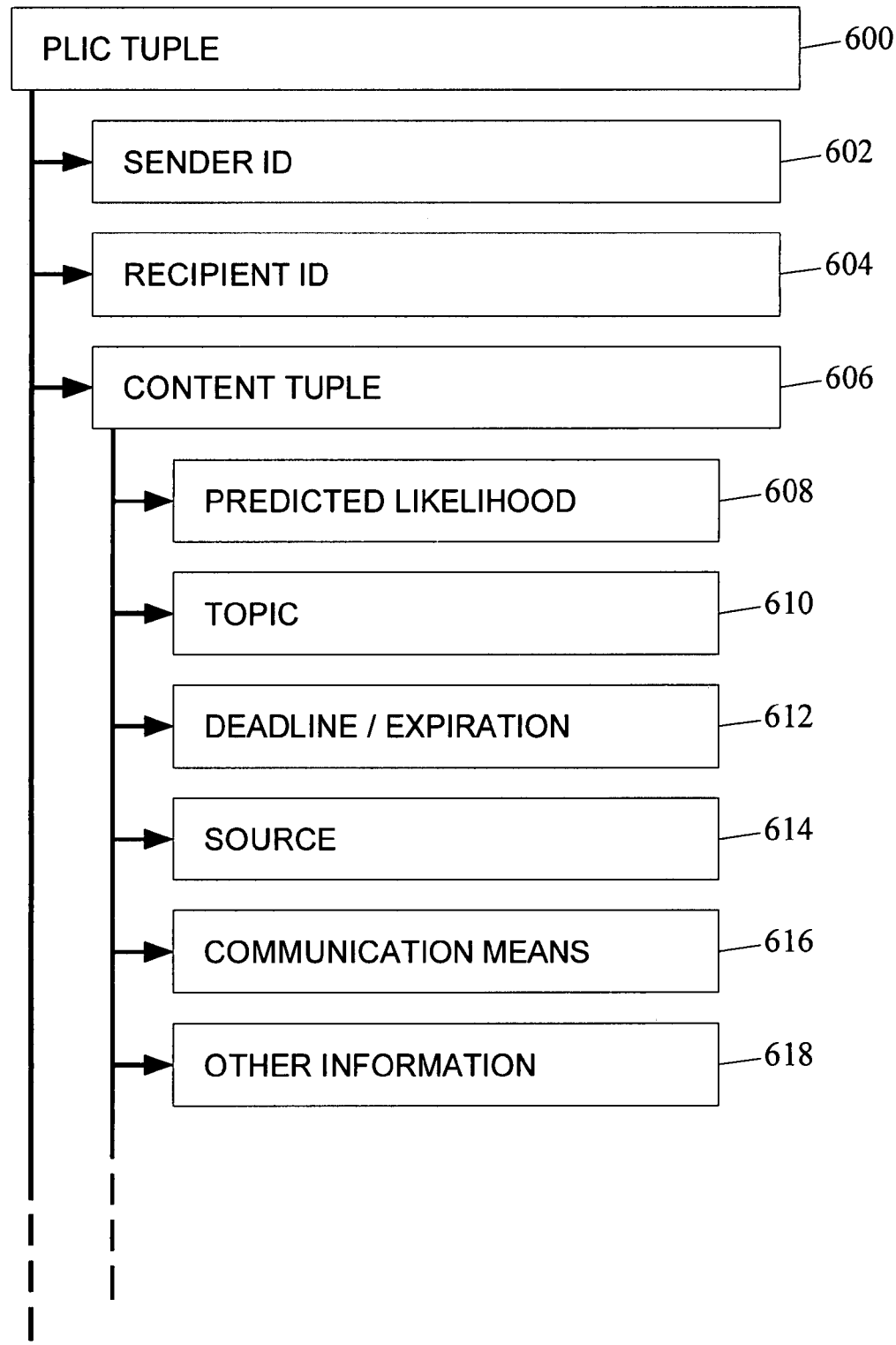
FIG. 6 is an alternative exemplary data/message structure used for associating the predicted likelihood with status information for the first user according to an embodiment of the subject matter described herein.

Referring to FIGS. 4, 5, and 6, in one embodiment, the principal status monitor 400 receives the predicted likelihood from communication initiation prediction subsystem 202 and stores the predicted likelihood in presence tuple 502 associated with the first user and/or the second user. In an alternative embodiment, the predicted likelihood is stored in PLIC tuple 600 (discussed below), which includes the identity of the first user, the identity of the second user, and the predicted likelihood, and which is associated with a presence tuple for the first user.

FIG. 4 is a block diagram illustrating an exemplary subsystem, device 206, for providing for indicating the status information with the predicted likelihood to the second user according to the subject matter described herein. Device 206 was introduced in FIG. 2 and depicted as a subsystem providing an operating system environment for communication initiation prediction subsystem 202 and presence client 208.

Referring to FIG. 4, presence client 208 may include a principal status monitor 400 for receiving the predicted likelihood from communication initiation prediction subsystem 202 and for associating the predicted likelihood with status information for the first user. In the embodiment illustrated in FIG. 4, therefore, principal status monitor 400 performs the functions of mapping entity 204 in FIG. 2.

FIG. 5 is a block diagram illustrating an exemplary data/message structure used for associating the predicted likelihood with status information for the first user according to an embodiment of block 104 of method 100. Referring to FIG. 5, presence information 500 includes a presence tuple 502. Each presence tuple 502 may include a Predicted Likelihood of Initiating Communication (PLIC) sub-tuple, identified in FIG. 5 as a PLIC tuple 504. PLIC tuple 504 includes a recipient tuple 506, which includes a recipient ID 508 for identifying a recipient, typically using a presence identifier, and a PLIC content tuple 510. The recipient is the second user. PLIC content tuple 510 includes information conveying the PLIC information, such as the message "Very likely to contact you". Each presence tuple 502 includes a status element 512, which contains information about the status of the first user, and a communication address tuple 514, which contains the contact address 516 of the first user and information about the contact means 518 that may be used by the recipient to contact the first user. By including PLIC content tuple 510 and status element 512 in the same presence tuple 502, the predicted likelihood is therefore associated with the first user's status. In this way, the association is performed by client 208.

FIG. 6 is a block diagram illustrating an alternative exemplary data/message structure used for associating the predicted likelihood with status information for the first user according to an embodiment of block 104 of method 100. FIG. 6 depicts one example of a PLIC tuple generated separately from the first user's status tuple. Referring to FIG. 6, PLIC tuple 600 includes a sender ID element 602 and a recipient ID element 604, which include information identifying the sender of the PLIC (the first user) and the intended recipient of the PLIC (the second user), respectively, and a PLIC content tuple 606. PLIC content tuple 606 includes predicted likelihood element 608, and may include additional information, such as the topic of the communication 610, the deadline/expiration of the likelihood of communication 612, the source of the predicted likelihood 614, the communication means 616, and other information 618.

PLIC tuple 600 is sent in a publish message to presence server 212 separately from the sending of the first user's status tuple, and may or may not be stored apart from the status tuple of the sender. The identifying information may be the presence identifiers of the sender and receiver, sender ID element 602 and recipient ID element 604, respectively. FIG. 6 illustrates a tuple for one predicted likelihood. An embodiment may support a PLIC list tuple that includes one or more PLIC tuples with different recipients. Including sender ID element 602 within PLIC tuple 600 allows presence server 212 to associate the PLIC with the presence tuple of the sender.

The exemplary tuple of FIG. 6 depicts a number of sub-elements under the content tuple element. In FIG. 5, the predicted likelihood was conveyed in the text phrase "Very likely to contact you." FIG. 6 depicts an alternative embodiment where the tuple contains optional information and where the generation of a summary text phrase, if performed, is done by server 212 or by the recipient's presence client B 208B. Referring back to the earlier example of User A putting a high-priority entry on his to-do list to call User B today a work-related issue, the contents of the sub-elements resulting from the analysis of this to-do entry could be:

Predicted likelihood: 0.9
Topic: the work-related issue
Deadline/expiration: today's date
Source: to-do list
Communication Means: telephone In alternative embodiments, sub-elements such as depicted in FIG. 6 can be provided in the presence tuple shown in FIG. 5. Alternatively, the text string from FIG. 5 may be included in the PLIC tuple depicted in FIG. 6, either as a replacement for the sub-elements shown or in addition to them.

At block 106 of method 100, indicating the status information with the predicted likelihood to the second user is provided for. System 200 includes means for providing for indicating the status information with the predicted likelihood to the second user.

In the previous block (block 104), in one embodiment, the predicted likelihood was associated with the first user's status by generating presence tuple 502 that contained both the first user's status, in status element 512, and the predicted likelihood, in PLIC content tuple 510. Referring to FIG. 2, to enable indicating the status information with the predicted likelihood to the second user, presence tuple 502 may be put into a publish message by the first user's presence client A 208A and sent to the presence service 210, from which it can be forwarded to the second user's presence client B 208B. Referring to FIG. 4, principal status monitor 400 generates presence tuple 502 as described in block 104. Principal status monitor 400 then generates a publish message to update the presence tuple in the presence service 210. Principal status monitor 400 generates a publish message and passes the message to a presence user agent (PUA 402), which routes it to presentity 214. The publish message is transmitted from presence client 208 to the presence service 210 through a presence protocol layer 404, which sends the messages via a network protocol stack 406 included in the operating environment of device 206.

The remaining components of FIG. 4—watcher 216, watcher user agent (WUA 408), friends list monitor 410, and status UI 412—are used by presence client 208 to receive and present the status information, including information regarding the predicted likelihood that the sender will initiate contact with the second user.

In one embodiment, the predicted likelihood is combined with status information and provided to the second user through a publish/subscribe system, such as a presence system. In an alternative embodiment, the predicted likelihood may be combined with status information and provided to the second user through communication means other than a presence system. For example, it could be sent in an email, in an instant message or other messaging system, or via a publish/subscribe system other than a presence system.

In the previous block (block 104), in another embodiment, the predicted likelihood was associated with the first user's status by generating a PLIC tuple. In this example, a publish message containing a PLIC tuple is sent to presence service 210 and the association of the status and the predicted likelihood information is made by presence service 210; the present block (block 106) is accomplished by having both the presence tuple and the PLIC tuple stored on server 212 and providing both to presence client B 208B when it subscribes to the first user's status.

In either case, the status information and/or the predicted likelihood may be sent in a notification message from server 212 to a device associated with the second user. For example, when presence client B 208B associated with the second user receives a status update regarding the status of the first user, information, if any, regarding the predicted likelihood of the first user initiating communication with the second user is included in status updates and is made available to the second user.

In one embodiment, the predicted likelihood is combined with status information and provided from server 212 to the second user through a publish/subscribe system, such as a presence system. In an alternative embodiment, the predicted likelihood may be combined with status information and provided from server 212 to the second user through communication means other than a presence system. For example, it could be sent in an email, in an instant message or other messaging system, or via a publish/subscribe system other than a presence system.

In embodiments that include a publish and subscribe server, such as a presence server, when the first user indicates a likelihood of contacting a second user, and that second user is not subscribed to the first user's status, the server may take one or more actions, such as automatically subscribing the second user to the first user; automatically subscribing the second user to the first user only if the predicted likelihood satisfies a threshold requirement; notifying the second user of the existence of the status information and/or the predicted likelihood, such as by sending a message to the second user's client indicating the predicted likelihood and enabling the client to display the information; and querying the second user for permission to subscribe the second user to the first user, and if such permission is received, subscribing the second user to the first user.

Similarly, when the second user's client or device receives an informational message (such as a directed notify) indicating that the second user is not subscribed to a first user and containing the status information with the predicted likelihood, the second user's device may then take an action, such as automatically subscribing the second user to the first user (i.e., automatically adding the first user to the second user's list of friends); automatically adding the first user to the second user's list of friends only if the predicted likelihood satisfies a threshold requirement, presenting a message asking if the first user should be added to the second user's list of friends, notifying the second user of the existence of the status information and/or the predicted likelihood, such as by displaying a message informing the second user of the prospective first user's status and/or likelihood of contacting the second user, or simply taking no action. Similarly, the first user's client or device may take similar action if it receives the status information with the predicted likelihood from communication initiation prediction subsystem 202, which detected that the first user has a high likelihood of initiation of communication with a second user to whom the first user is not subscribed.

A presence server may also use the predicted likelihood information to modify the sending of presence information. For example, when a client has been logged off or communications has been disrupted and then reestablished there may be a large number of status notifications for the presence server to send to the client. The sending of these can be prioritized using the likelihood indicators.

Figure 7:
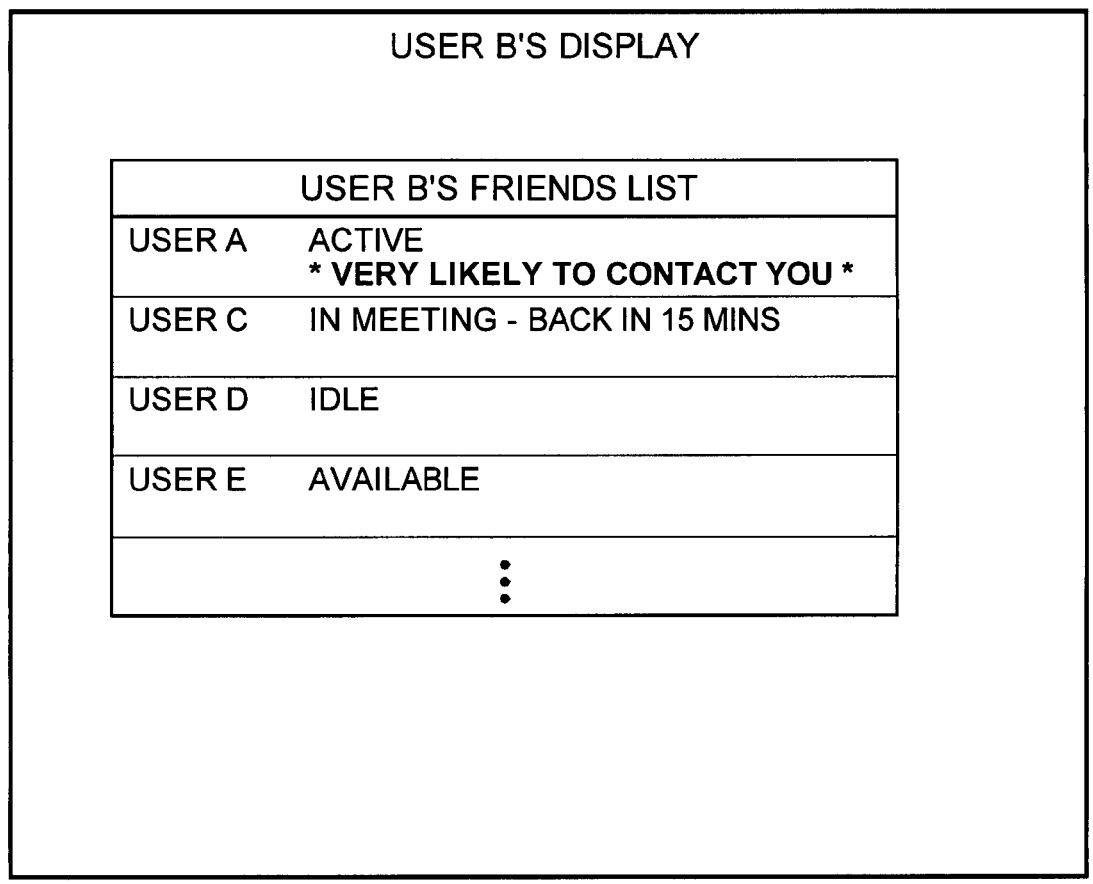
FIG. 7 illustrates an exemplary indication of the status information with the predicted likelihood to the second user according to an embodiment of the subject matter described herein.

FIG. 7 illustrates an exemplary indication of the status information with the predicted likelihood to the second user according to an embodiment of block 106 of method 100. FIG. 7 depicts an example of how the status information with the predicted likelihood can be displayed on the graphic user interface (GUI) of a presence client. This example shows the information that may be displayed by User B's presence client B 208B. The status of User A is shown as "Active;" this status presentation is typical of presence clients. Under that line is a new line with the text: "Very likely to contact you." This is an example of how the predicted likelihood that the first user (in this case User A) will initiate contact with a second user (in this case User B) can be presented by a presence client. The subject matter described herein may be implemented using a computer readable medium containing a computer program, executable by An instruction execution machine, system, apparatus, or device, such as a computer. Exemplary computer readable media suitable for implementing the subject matter described herein include chip memory devices, disk memory devices, programmable logic devices, and application specific integrated circuits. In addition, a computer-readable medium that implements the subject matter described herein may be located on a single device or computing platform or may be distributed across multiple devices or computing platforms.

The executable instructions of a computer program for carrying out the methods illustrated in FIG. 1 can be embodied in any machine or computer readable medium for use by or in connection with an instruction execution machine, system, apparatus, or device, such as a computer-based or processor-containing machine, system, apparatus, or device, that can read or fetch the instructions from the machine or computer readable medium and execute the instructions.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing predicted likelihood of communication between users, the method comprising:
   predicting a likelihood that a first user will initiate communication with a second user based on stored information for the first user that indicates the second user;
   associating the predicted likelihood with status information for the first user; and
   providing an indication of the status information with the predicted likelihood to the second user,
   wherein at least one of the preceding actions is performed on at least one electronic hardware component.

2. The method of claim 1 wherein predicting the likelihood includes predicting a likelihood that the first user will accept an attempted contact from the second user.

3. The method of claim 1 wherein predicting the likelihood is performed on at least one of a device of the first user and a server.

4. The method of claim 1 wherein parameters used to predict the likelihood are customizable by the first user based on at least one of the source of the stored information for the first user, the type of the stored information for the first user, and the identity of the second user.

5. The method of claim 1 wherein the stored information for the first user includes information from at least one of a task list, a to-do list, a project schedule, a project calendar, a personal calendar, an email system, an email log, a telephone log, an instant message log, an information source indicating current and future activity of the first user, and an information source indicating past activity of the first user.

6. The method of claim 1 wherein the stored information for the first user includes information that is located on at least one of a device of the first user and a server.

7. The method of claim 1 wherein predicting the likelihood includes predicting the likelihood based on prior communications between the first and second users.

8. The method of claim 1 wherein the predicted likelihood comprises a numeric probability.

9. The method of claim 1 wherein associating the predicted likelihood with status information for the first user is performed by at least one of a first user's device and a server.

10. The method of claim 1 wherein associating the predicted likelihood with status information includes storing the predicted likelihood in a presence tuple associated with at least one of the first user and the second user.

11. The method of claim 1 wherein associating the predicted likelihood with status information includes storing the predicted likelihood in a tuple including the identity of the first user, the identity of the second user, and the predicted likelihood, wherein the tuple is associated with a presence tuple for the first user.

12. The method of claim 1 wherein providing an indication of the status information with the predicted likelihood to the second user includes using at least one of a publish/subscribe protocol, a presence protocol, an email protocol, and a messaging protocol.

13. The method of claim 1 wherein providing an indication of the status information with the predicted likelihood to the second user includes sending a notification message from a publish/subscribe server to a device associated with the second user.

14. The method of claim 1 wherein providing an indication of the status information with the predicted likelihood to the second user includes receiving a notification message from a publish/subscribe server at a device associated with the second user.

15. The method of claim 1 wherein providing an indication of the status information with the predicted likelihood to the second user includes modifying a characteristic of a presentation element of a device associated with the second user.

16. The method of claim 1 comprising receiving the status information with the predicted likelihood at a client of the second user, and in response to receiving the status information with the predicted likelihood, indicating, by the client of the second user, at least one of the status information and the predicted likelihood to the second user.

17. The method of claim 1 comprising receiving the status information with the predicted likelihood at a client of the first user, and in response to receiving the status information with the predicted likelihood, indicating, by the client of the first user, at least one of the status information and the predicted likelihood to the first user.

18. The method of claim 1 comprising receiving the status information with the predicted likelihood at a client of the second user, determining that the second user is not subscribed to the first user, and in response to such determination, using the client of the second user for:
- notifying the second user of the existence of the status information with the predicted likelihood;
- notifying the second user of the contents of at least one of the status information and the predicted likelihood;
- querying the second user for permission to subscribe the second user to the first user, and in response to receiving such permission, subscribing the second user to the first user;
- automatically subscribing the second user to the first user upon a determination that the predicted likelihood satisfies a threshold requirement; and
- automatically subscribing the second user to the first user.

19. The method of claim 1 wherein providing an indication of the status information with the predicted likelihood to the second user includes providing for communicating the status information with the predicted likelihood to a server and providing for communicating, by the server, at least one of the status information and the predicted likelihood to the second user.

20. The method of claim 19 wherein communication to and from the server includes communication using at least one of a publish/subscribe protocol, a presence protocol, an email protocol, and a messaging protocol.

21. The method of claim 19 wherein providing for communicating at least one of the status information and the predicted likelihood to the second user includes determining, by the server, that the second user is not subscribed to the first user, and in response to a determination that the second user is not subscribed to the first user, using the server for at least one of:
- prohibiting communication of the at least one of the status information and the predicted likelihood to the second user;
- notifying the second user of the existence of the at least one of the status information and the predicted likelihood;
- notifying the second user of the contents of the at least one of the status information and the predicted likelihood;
- querying the second user for permission to subscribe the second user to the first user, and in response to receiving such permission, subscribing the second user to the first user;
- automatically subscribing the second user to the first user upon a determination that the predicted likelihood satisfies a threshold requirement; and
- automatically subscribing the second user to the first user.

22. A system for providing predicted likelihood of communication between users, the system comprising:
- a communication initiation prediction subsystem for predicting a likelihood that a first user will initiate a communication with a second user based on stored information for the first user that indicates the second user;
- a mapping entity for associating the predicted likelihood with status information for the first user; and
- a first device for providing an indication of the status information with the predicted likelihood to the second user.

23. The system of claim 22 wherein the communication initiation prediction subsystem is adapted for predicting a likelihood that the first user will accept an attempted contact from the second user.

24. The system of claim 22 wherein the stored information for the first user includes information from at least one of a task list, a to-do list, a project schedule, a project calendar, a personal calendar, an email system, an email log, a telephone log, an instant message log, an information source indicating current and future activity of the first user, and an information source indicating past activity of the first user.

25. The system of claim 22 wherein the stored information for the first user includes information that is located on at least one of a device of the first user and a presence server.

26. The system of claim 22 wherein the predicted likelihood comprises a numeric probability.

27. The system of claim 22 wherein the first device is adapted to indicate the status information with the predicted likelihood to the second user by using at least one of a publish/subscribe protocol, a presence protocol, an email protocol, and a messaging protocol.

28. The system of claim 22 comprising a second device for receiving the status information with the predicted likelihood and for indicating to the second user at least one of the status information and the predicted likelihood.

29. The system of claim 28 wherein the second device indicates to the second user at least one of the status information and the predicted likelihood by modifying a characteristic of a presentation element of the second user that is associated with the first user.

30. The system of claim 22 comprising a server for receiving the status information with the predicted likelihood and for providing for indicating to the second user at least one of the status information and the predicted likelihood.

31. The system of claim 30 wherein the server is adapted to communicate with the first device and a device associated with the second user by using at least one of a publish/subscribe protocol, a presence protocol, an email protocol, and a messaging protocol.

32. The system of claim 31 wherein the server is adapted to determine if the second user is not subscribed to the first user, and in response to a determination that the second user is not subscribed to the first user, to least one of:
prohibit communication of the at least one of the status information and the predicted likelihood to the second user;
notify the second user of the existence of the at least one of the status information and the predicted likelihood;
notify the second user of the contents of the at least one of the status information and the predicted likelihood;
query the second user for permission to subscribe the second user to the first user, and in response to receiving such permission, subscribe the second user to the first user;
automatically subscribe the second user to the first user upon a determination that the predicted likelihood satisfies a threshold requirement; and
automatically subscribe the second user to the first user.

33. A system for providing predicted likelihood of communication between users, the system comprising:
means for predicting a likelihood that a first user will initiate communication with a second user based on stored information for the first user that indicates the second user;
means for associating the predicted likelihood with status information for the first user; and
means for providing an indication the status information with the predicted likelihood to the second user,
wherein at least one of the means include at least one electronic hardware component.

34. A tangible computer readable medium containing a computer program, executable by a machine, for predicting and communicating user contact means, the computer program comprising executable instructions for:
predicting a likelihood that a first user will initiate communication with a second user based on stored information for the first user that indicates the second user;
associating the predicted likelihood with status information for the first user; and
providing an indication of the status information with the predicted likelihood to the second user.

* * * * *